(12) United States Patent
Roselli et al.

(10) Patent No.: US 9,915,678 B2
(45) Date of Patent: *Mar. 13, 2018

(54) SENSOR DEVICE PROVIDED WITH A CIRCUIT FOR DETECTION OF SINGLE OR MULTIPLE EVENTS FOR GENERATING CORRESPONDING INTERRUPT SIGNALS

(71) Applicant: STMICROELECTRONICS S.R.L., Agrate Brianza (IT)

(72) Inventors: Giuditta Roselli, Lecce (IT); Michele Tronconi, S. Martino Siccomario (IT); Fabio Pasolini, S. Martino Siccomario (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,118

(22) Filed: Dec. 2, 2015

(65) Prior Publication Data

US 2016/0091527 A1 Mar. 31, 2016

Related U.S. Application Data

(60) Division of application No. 14/104,873, filed on Dec. 12, 2013, now Pat. No. 9,234,911, which is a
(Continued)

(30) Foreign Application Priority Data

Dec. 4, 2006 (IT) .............................. TO2006A0861

(51) Int. Cl.
*G01P 13/00* (2006.01)
*G01P 15/08* (2006.01)
(Continued)

(52) U.S. Cl.
CPC ............ *G01P 15/125* (2013.01); *G01P 13/00* (2013.01); *G01P 15/0802* (2013.01);
(Continued)

(58) Field of Classification Search
CPC ........ G01P 13/00; G06F 13/24; G06F 1/1613; G06F 1/1684; G06F 2200/1636; G06F 2200/1637; G06F 3/017; G06F 3/0383
(Continued)

(56) References Cited

U.S. PATENT DOCUMENTS

| 4,633,465 A | 12/1986 | Fitch et al. |
| 4,656,634 A | 4/1987 | Lombardi et al. |

(Continued)

FOREIGN PATENT DOCUMENTS

| DE | 102004001226 A1 | 8/2005 |
| JP | 2000-56897 A | 2/2000 |

OTHER PUBLICATIONS

STMicroelectronics, preliminary data for "LIS302DL: MEMs motion sensor, 3-axis - ±2g/±8g smart digital output "piccolo" accelerometer," Rev 1, Oct. 2006, 29 pages.

*Primary Examiner* — James C Kerveros
(74) *Attorney, Agent, or Firm* — Seed IP Law Group LLP (57) ABSTRACT

A sensor device for an electronic apparatus is provided with: a sensing structure generating a first detection signal; and a dedicated integrated circuit, connected to the sensing structure, detecting, as a function of the first detection signal, a first event associated to the electronic apparatus and generating a first interrupt signal upon detection of the first event. The dedicated integrated circuit detects the first event as a function of a temporal evolution of the first detection signal, and in particular as a function of values assumed by the first detection signal within one or more successive time windows, and of a relation between these values.

17 Claims, 5 Drawing Sheets

Related U.S. Application Data continuation of application No. 11/950,054, filed on Dec. 4, 2007, now Pat. No. 8,612,810.

(51) Int. Cl.
| | |
|---|---|
| *G01P 15/125* | (2006.01) |
| *G06F 1/16* | (2006.01) |
| *G06F 13/24* | (2006.01) |
| *G06F 3/01* | (2006.01) |
| *G06F 3/038* | (2013.01) |

(52) U.S. Cl.
CPC .......... *G06F 1/1613* (2013.01); *G06F 1/1684* (2013.01); *G06F 3/017* (2013.01); *G06F 3/0383* (2013.01); *G06F 13/24* (2013.01); *G06F 2200/1636* (2013.01); *G06F 2200/1637* (2013.01)

(58) Field of Classification Search
USPC .......................................................... 714/724
See application file for complete search history.

(56) References Cited

U.S. PATENT DOCUMENTS

| | | | |
|---|---|---|---|
| 5,530,649 A | 6/1996 | Fujishima | |
| 5,598,431 A | 1/1997 | Lobel | |
| 5,616,864 A * | 4/1997 | Johnson | G01C 19/5684 73/504.04 |
| 5,703,409 A | 12/1997 | Fukumitsu et al. | |
| 6,445,882 B1 | 9/2002 | Hirano | |
| 6,597,532 B1 * | 7/2003 | Usui | G11B 5/5582 360/99.23 |
| 6,621,652 B2 | 9/2003 | Haines et al. | |
| 6,757,863 B2 | 6/2004 | Kaneshige et al. | |
| 7,216,053 B2 | 5/2007 | Rakkola et al. | |
| 7,295,112 B2 | 11/2007 | Bowser et al. | |
| 7,450,332 B2 | 11/2008 | Pasolini et al. | |
| 7,461,307 B2 | 12/2008 | Gunda et al. | |
| 7,480,838 B1 | 1/2009 | Wilkerson et al. | |
| 7,574,314 B2 | 8/2009 | Ford et al. | |
| 7,640,127 B2 | 12/2009 | Doi | |
| 7,690,253 B2 | 4/2010 | Noda et al. | |
| 7,788,573 B2 | 8/2010 | Yamanaka | |
| 7,793,544 B2 | 9/2010 | Merassi et al. | |
| 7,895,469 B2 | 2/2011 | Özer et al. | |
| 8,041,328 B2 * | 10/2011 | Orr | G06F 1/3203 340/669 |
| 2003/0034959 A1 * | 2/2003 | Davis | G06F 3/0317 345/166 |
| 2006/0042382 A1 * | 3/2006 | DCamp | B81B 7/0074 73/493 |
| 2006/0200471 A1 | 9/2006 | Holland et al. | |
| 2006/0214913 A1 | 9/2006 | Pedrazzini et al. | |
| 2006/0271870 A1 | 11/2006 | Anwar | |
| 2006/0280202 A1 * | 12/2006 | Kelly | H04L 41/08 370/464 |
| 2007/0068252 A1 * | 3/2007 | Honkura | G01C 17/28 73/514.16 |
| 2007/0169551 A1 * | 7/2007 | Kelly | G01D 3/022 73/514.01 |
| 2009/0043230 A1 * | 2/2009 | Davis-Havill | A61B 5/1118 600/595 |

\* cited by examiner

SENSOR DEVICE PROVIDED WITH A CIRCUIT FOR DETECTION OF SINGLE OR MULTIPLE EVENTS FOR GENERATING CORRESPONDING INTERRUPT SIGNALS

TECHNICAL FIELD

The present disclosure generally relates to a sensor device provided with a circuit for detecting single or multiple events, for generating corresponding interrupt signals. In particular but not exclusively, the following treatment will make specific reference, without this implying any loss of generality, to an accelerometer sensor device and to detection of events based on the analysis of the changes over time (i.e., temporal evolution) of acceleration signals detected by the accelerometer sensor.

BACKGROUND INFORMATION

As is known, the increasing use of portable apparatuses—such as laptops, PDAs (Personal Data Assistants), digital audio players, cellphones, digital camcorders, and the like—or electronic apparatuses in general (personal computers, consoles for videogames and associated peripherals, etc.) has led to an increasing need to simplify use thereof, in particular as regards the user interface. In this connection, the possibility of activating given functions or programs of these apparatuses by a simple user control action directly involving the electronic apparatus has been considered of particular interest (for example, a displacement or an inclination of the apparatus, or a force or pressure exerted on the same apparatus).

For this purpose, in some electronic apparatuses, sensor devices have been introduced for detection of control actions imparted by the user (for example, inertial sensors, such as accelerometers or gyroscopes). In particular, the use of MEMS (micro-electromechanical systems) sensors, made with semiconductor technologies, has proven advantageous given their small dimensions and consequent small area occupation. A microprocessor circuit, supervising the general operation of the electronic apparatus, is able to determine user control actions and to activate corresponding functions or programs within the apparatus, via monitoring of the detection signals generated by the sensor devices.

Moreover, the use of detection signals coming from sensor devices on board the electronic apparatuses has been proposed for recognition, via suitable processing operations, of particular apparatus conditions, such as for example, a condition of free fall, or of reactivation from stand-by (wake-up function).

Solutions of this sort, although having the potential advantage of simplifying the interface and improving the general functionality of electronic apparatuses, have the problem of burdening the apparatus microprocessor circuit with continuous monitoring of the detection signals from the sensor devices, and processing of the same signals for recognition of the control actions exerted by the user or of the aforesaid conditions (more in general, of "events" associated to the electronic apparatuses). There follows a general degradation of the performance of the electronic apparatus, and/or a poor promptness thereof in recognizing the aforesaid events.

In order to overcome this problem, the integration within the sensor devices of event-recognition related functions has recently been proposed. In particular, a dedicated integrated circuit has been associated to a detection structure of these devices, the circuit being designed to carry out simple processing operations based on the signals generated by the detection structure for recognition of given events (for example, free-fall or wake-up events). Upon recognition of an event, the integrated circuit generates an interrupt signal for the microprocessor circuit of the electronic apparatus that incorporates the sensor device so that it can promptly activate appropriate actions associated to the detected event, this without using internal resources for event recognition.

However, also due to the small amount of resources and the small area available for integration within the sensor devices, the aforesaid integrated circuits are not currently able to carry out complex processing operations on the detection signals, necessary for example, for recognition of particular (e.g., multiple) events, so that the computational burden for the microprocessor circuits on board the portable apparatuses in given applications remains high.

BRIEF SUMMARY

One embodiment of the present invention overcomes the aforesaid problems and disadvantages and provides a sensor device, provided with an integrated circuit for processing detected signals, that will be able to identify even particular or multiple events.

According to one embodiment of the present invention, a sensor device is consequently provided, the sensor device including:

a sensing structure configured to generate at least a first detection signal; and a dedicated integrated circuit coupled to said sensing structure and configured to detect, as a function of said first detection signal, at least a first event associated to said electronic apparatus, and to generate a first interrupt signal upon detection of said first event, wherein said dedicated integrated circuit is configured to detect said first event as a function of a change over time (i.e., temporal evolution) of said first detection signal.

BRIEF DESCRIPTION OF THE SEVERAL VIEWS OF THE DRAWINGS

For a better understanding, one or more embodiments are now described, purely by way of non-limiting and non-exhaustive examples and with reference to the attached drawings, wherein.

DETAILED DESCRIPTION

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
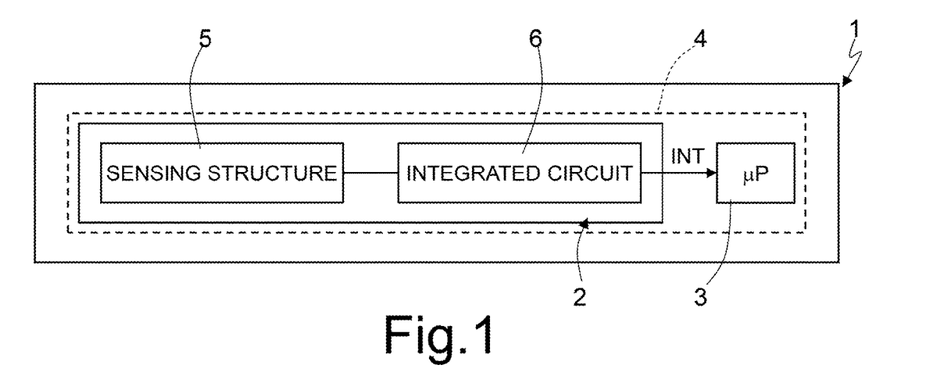
FIG. 1 is a block diagram of an electronic apparatus having a sensor device according to one embodiment of the present invention.

FIG. 1 shows an embodiment of an electronic apparatus 1 (for example, a portable apparatus such as a mobile phone, a laptop, a PDA, a digital audio player, a digital camcorder, or the like), comprising a sensor device 2 and a microprocessor circuit 3, connected to the sensor device 2 (for example, the microprocessor circuit 3 and the sensor device 2 are both coupled to a printed-circuit board 4 inside the electronic apparatus 1). The sensor device 2 comprises a sensing structure 5 and a dedicated integrated circuit 6, basically of a hardware type, connected to the sensing structure 5. The sensing structure 5 generates detection signals associated to the condition of the electronic apparatus 1 (which are treated and possibly converted into digital form with a given refresh rate, in a known way that is not described in detail herein), and the dedicated integrated circuit 6 processes the detection signals for generating at output, continuously and in real time, interrupt signals INT for the microprocessor circuit 3, upon occurrence of given events. The sensing structure 5 and the dedicated integrated circuit 6 are integrated in the same chip with the same package, in one embodiment also in the same die of semiconductor material; for example, the sensing structure 5 is made with MEMS technology, and the dedicated integrated circuit 6 is made with CMOS processes.

As will be described in what follows, an embodiment of the present invention envisages that the dedicated integrated circuit 6 will be able to recognize the change over time (i.e., temporal evolution) of the detection signals within a given time window, or in successive time windows, so as to detect particular events (for example, ones having a pre-set duration), or multiple events (for example, repeated at pre-set time intervals). The dedicated integrated circuit 6 is basically able to detect events not only based on the instantaneous value of the detection signals, but also based on the time window in which the detection signals assume this value and based on the relation with past values of the same signals.

Figure 2:
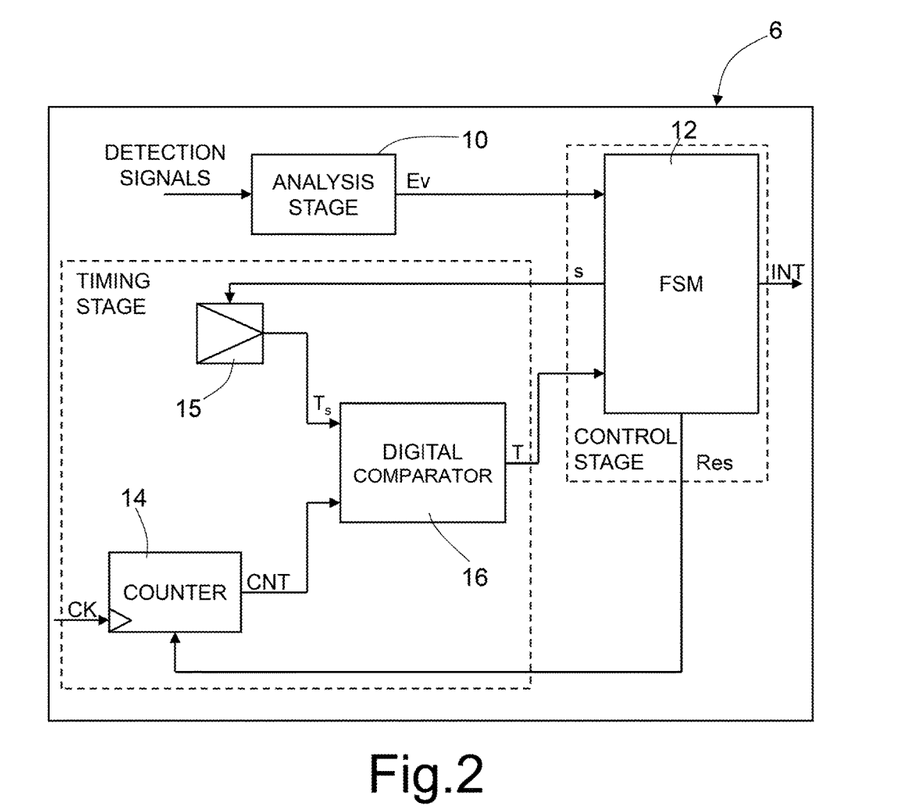
FIG. 2 shows a general block diagram of one embodiment of a circuit integrated in the sensor device of FIG. 1.

FIG. 2 is a block diagram illustrating one embodiment of a circuit integrated in the sensor device of FIG. 1. FIG. 2 includes a timing stage, configured to generate a time signal indicative of a time window in which the first detection signal assumes the instantaneous value. The timing stage includes a counter, configured to generate a count signal based on a clock signal and to be reset by a reset signal supplied by the control stage, a storage register, configured to store time values associated to time windows and to supply at output one of the time values as a function of a current-state signal received by the control stage, and a comparator, coupled to the counter and to the storage register and configured to compare the count signal with the time value to generate the time signal. FIG. 2 also includes a control stage, coupled to the analysis stage and to the timing stage and configured to generate the first interrupt signal as a function of the event signal and the time signal. The control stage includes a finite-state machine, a state transition of which is determined by values of the event signal and of the time signal.

In detail, the dedicated integrated circuit 6 of one embodiment comprises (FIG. 2): an analysis stage 10, that receives at its input the detection signals from the sensing structure 5 (not illustrated herein), carries out an analysis based on the instantaneous value of these detection signals, and generates an event signal Ev (for example, a binary signal) upon recognition of a condition potentially indicative of an event associated to the electronic apparatus 1; a finite-state-machine (FSM) stage 12, which receives at its input the event signal Ev and a time signal T, and generates at its output the interrupt signals INT, a reset signal Res, and a current-state signal S; a counter stage 14, which receives at its input a clock signal CK (the frequency of which can be set from outside) and the reset signal Res, and supplies at its output a count signal Cnt; a time register 15, storing time values $T_s$ corresponding to pre-set time intervals (for example, ranging between 0 and 128 ms, with steps of 0.5 ms), and supplying at its output one of the time values as a function of the current-state signal S coming from the FSM stage 12; and a digital comparator stage 16, receiving at its input the count signal Cnt and the time value $T_s$ from the counter stage 14, and supplying at its output the time signal T (having a binary value).

If the value of the detection signals received at input satisfies given conditions, the analysis stage 10 recognizes a potential event and generates an event signal Ev having a given value (for example, the high value "1"). The counter stage 14 increments the count signal Cnt at each cycle of the clock signal CK, and when the count signal Cnt exceeds the time value $T_s$ stored in the time register 15, the time signal T at output from the digital comparator stage 16 also assumes a high value. The FSM stage 12 evolves as a function of the values of the event signal Ev and the time signal T, a high value of one and/or the other of the two signals determining a transition from one state to another (as will be described in detail hereinafter). Evidently, the interrupt signals INT generated at output from the FSM stage 12 are a function not only of the instantaneous value of the detection signals (based on the event signal Ev), but also of the time window in which this value is found (based on the time signal T), and of the past values of the same signals (on account of the very nature of the finite-state machine). According to the state transition, the FSM stage 12 can also reset the counter stage 14 (and hence the count signal Cnt) via the reset signal Res, and modify the time value $T_s$ at output from the time register 15 so as to set the value of the time window based on which the digital comparator stage 16 makes the comparison.

One embodiment of the present invention is now described, for detection of single and/or double "click" events in the electronic apparatus 1, where by "click" is meant an event comparable to the pressure on a key or push-button, generated by a force/pressure exerted by the user (for example, by a slight tap) on a casing of the electronic apparatus 1, e.g., on a given portion thereof.

In a known way, electronic apparatuses are provided with one or more keys or push-buttons that enable, via pressure thereon, entry of commands (since the pressure produces a sound event, the operation of a key is commonly defined as "click" or "click event"). In particular, a single pressure (single-click event) or a consecutive double pressure (double-click event) of a key are designed to generate different commands and must consequently be distinguished during a detection step.

In the specific case, the pressure exerted by the user on the casing of the portable apparatus 1 is comparable to a click event, and causes a mechanical stress within the casing reaching the sensor device 2. In order to detect the mechanical stress, the corresponding sensing structure 5 comprises a triaxial linear inertial sensor (in particular, an accelerometer) of a MEMS type, which detects a first acceleration signal $A_x$, a second acceleration signal $A_y$, and a third acceleration signal $A_z$, corresponding to the components of the acceleration acting on the electronic apparatus 1 along three independent axes of detection, orthogonal to one another and forming a set of three cartesian axes. In a per-se known manner (and for this reason not illustrated), the inertial sensor is made up of elastically mobile elements and fixed elements, and in particular comprises a mobile mass associated to which are mobile electrodes, and fixed electrodes arranged, in pairs, on opposite sides of a respective mobile electrode, to form therewith a pair of differential capacitors for each axis of detection. When the sensor is subjected to forces, and accelerations acting along the three axes of detection x, y, and z, the mobile elements of the sensor undergo an inertial displacement with respect to the fixed elements, which is proportional to the acceleration to which the sensor is subjected. Corresponding capacitive variations are thus generated, one for each axis of detection. In this way, the sensing structure 5 is able to detect click events occurring along any one of the axes of detection x, y, z.

Figure 3:
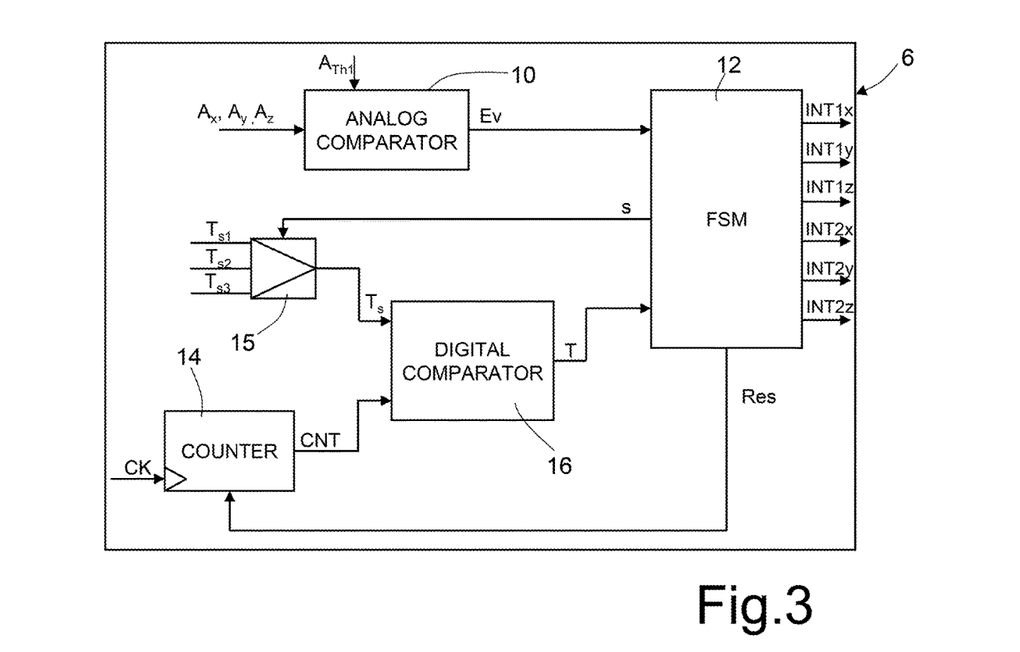
FIG. 3 shows a more detailed block diagram of the integrated circuit, according to a particular embodiment of the present invention.

In greater detail, and with reference to FIG. 3, one embodiment of the dedicated integrated circuit 6 receives at its input alternately the first, the second, or the third detection signal $A_x$, $A_y$, $A_z$. For example, the axis of detection and the corresponding detection signal can be selected through a control register (not illustrated), or else the detection signals $A_x$, $A_y$, $A_z$ can be supplied alternately at pre-set time intervals by a multiplexer (not illustrated), set between the sensing structure 5 and the dedicated integrated circuit 6. The analysis stage 10 comprises an analog comparator, which receives the detection signal $A_x$, $A_y$, $A_z$ and a first acceleration threshold $A_{Th1}$ (which can be set from outside) and generates the event signal Ev as a function of the relation between the detection signal and the acceleration threshold. For example, in the analysis stage 10 the absolute value of the detection signal $A_x$, $A_y$, $A_z$ can be extracted, the first acceleration threshold $A_{Th1}$ can have a given positive value, and the event signal Ev can have a high value when the detection signal $A_x$, $A_y$, $A_z$ is greater than the first acceleration threshold $A_{Th1}$. The FSM stage 12 generates at its output first interrupt signals corresponding to the single-click event along the three axes of detection x, y, z (designated, respectively, by INT1$x$, INT1$y$, INT1$z$), and second interrupt signals corresponding to the double-click event once again along the three axes of detection (designated, respectively, by INT2$x$, INT2$y$, INT2$z$). For reasons that will be clarified in what follows, the time register 15 stores in this case three time values $T_s$, different from one another: a limit time value $T_{s1}$, a latency time value $T_{s2}$, and a window time value $T_{s3}$, which are sent to the digital comparator stage 16 as a function of the current-state signal S.

Figure 4A:
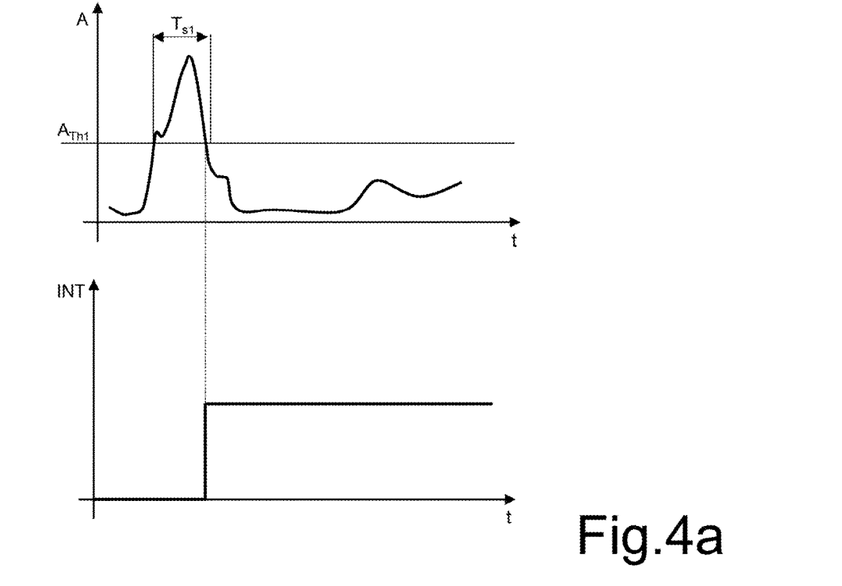
FIGS. 4*a*, 4*b* and 5 show example plots of quantities related to one embodiment of the sensor device.
Figure 4B:
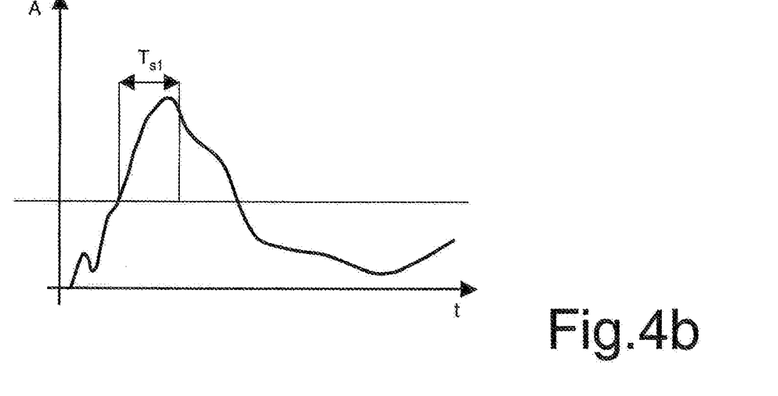

In particular, and as illustrated in FIG. 4a, the dedicated integrated circuit 6 is configured so as to detect a single-click event along one of the axes of detection x, y, z and to generate the corresponding first interrupt signal INT1$x$, INT1$y$, INT1$z$, when the value of the detection signal $A_x$, $A_y$, $A_z$ along the axis of detection exceeds the first acceleration threshold $A_{Th1}$, and subsequently returns below the same threshold within a predetermined time interval, in particular within the limit time value $T_{s1}$. Instead, as illustrated in FIG. 4b, no interrupt signal is generated in the case where the detection signal $A_x$, $A_y$, $A_z$ returns below the first acceleration threshold $A_{Th1}$ after the aforesaid time interval has already elapsed (the count signal Cnt has consequently exceeded the limit time value $T_{s1}$).

Figure 5:
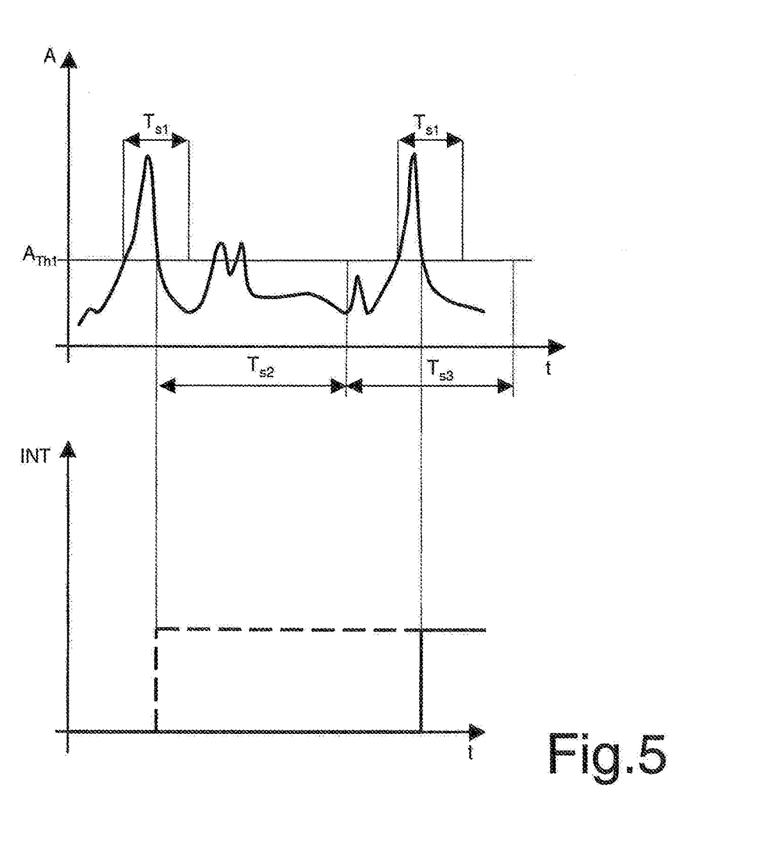

As illustrated in FIG. 5, the dedicated integrated circuit 6 is further configured so as to recognize a double-click event along one of the axes of detection x, y, z and to generate the corresponding second interrupt signal INT2$x$, INT2$y$, INT2$z$, when, in two consecutive time intervals, the value of the detection signal $A_x$, $A_y$, $A_z$ along this axis of detection remains above the first acceleration threshold $A_{Th1}$ for a time shorter than the one corresponding to the limit time value $T_{s1}$. In particular, the second threshold crossing must not occur before expiry of a latency time interval, corresponding to the latency time value $T_{s2}$, from recognition of the single-click event, and also, once the latency time interval has elapsed, crossing of the threshold must occur within a time window corresponding to the window time value $T_{s3}$. The second click event must occur with the same modalities as the first click event, and consequently the detection signal must return below the first acceleration threshold $A_{Th1}$ before expiry of the limit time value $T_{s1}$. During the latency time interval, any possible exceeding of the threshold by the detection signal is ignored (possible bounce signals on the detection signal are in this way filtered out). Instead, no interrupt signal is generated in the case where the second threshold crossing occurs after the window time value $T_{s3}$, or else in the case where the second threshold crossing, although occurring within the aforesaid window, lasts for a period longer than the limit time value $T_{s1}$.

Figure 6:
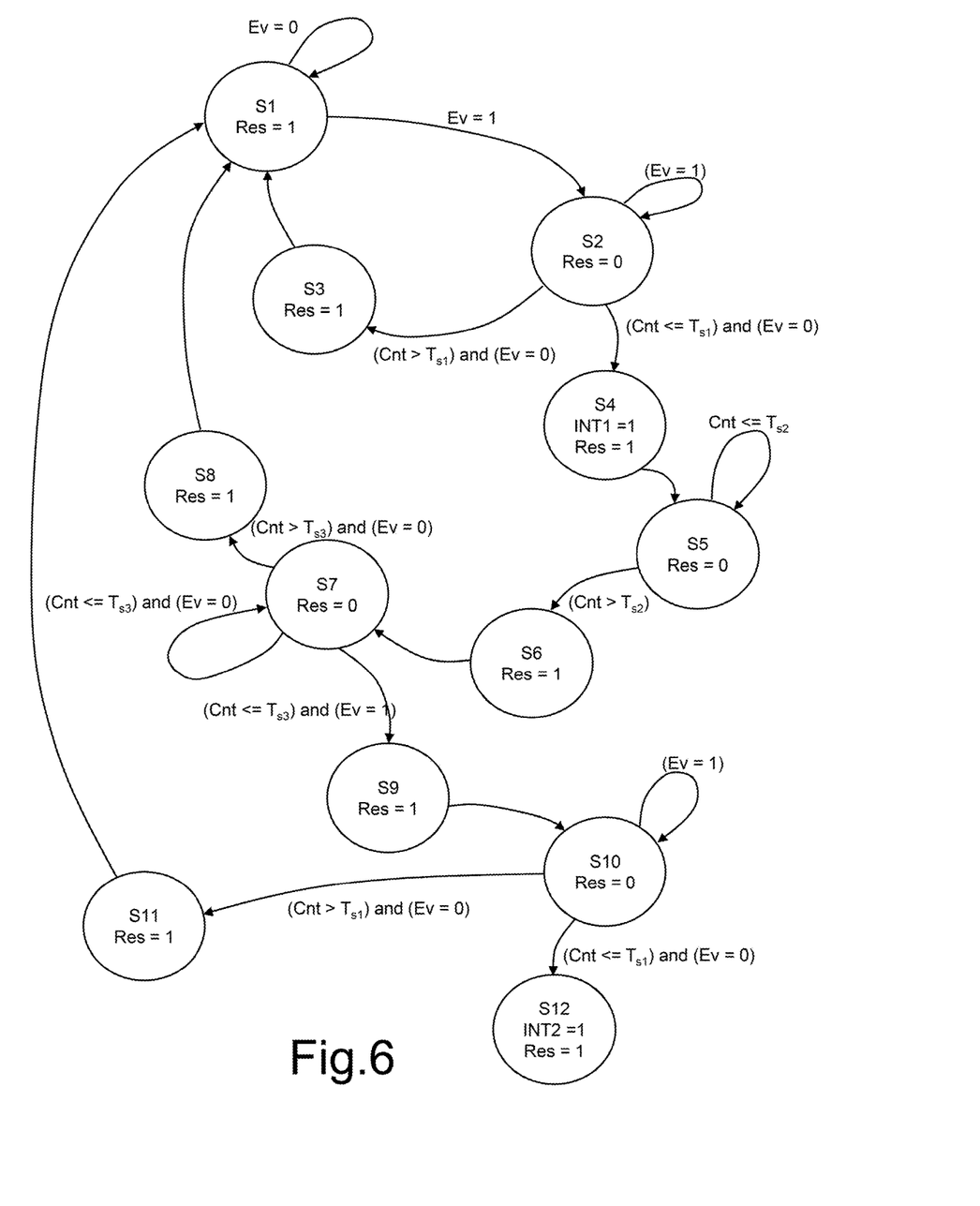
FIG. 6 shows a state transition diagram in a finite-state-machine stage of the integrated circuit of FIG. 3 according to one embodiment.

Operation of one embodiment of the FSM stage 12 for recognition of the single-click and double-click events is now described with reference to the state transition diagram of FIG. 6. Transition from one state to the next depends on the value of the event signal Ev and/or the value reached by the count signal Cnt (which determines the value of the time signal T). When the counter stage 14 is to be reset, in order to start again counting in the next state, the reset signal Res is set to a high state. The finite-state machine 12 evolves at a rather high frequency (for example, 38 kHz), higher than the frequency of the clock signal CK of the counter stage 14 so as to detect the events promptly. In particular, the frequency of evolution of the finite-state machine 12 is a function of the refresh frequency of the detection signals coming from the sensing structure 5 (and consequently depends on the type of sensor implemented). The frequency of the clock signal CK depends, instead, for example, on the duration of the events that are to be detected. In this way, each time the value of the detection signals is updated, the finite-state machine 12 can reconsider its state, irrespective of the clock signal CK.

In detail, in an initial state S1 the finite-state machine 12 is awaiting recognition of a click. Consequently, it remains in the state S1 as long as the detection signal $A_x$, $A_y$, $A_z$ remains below the first acceleration threshold $A_{Th1}$ (event signal Ev low). The reset signal Res is in the high state so as to maintain the count signal Cnt at zero.

When the event signal Ev switches to the high value (the detection signal exceeds the threshold), the finite-state machine 12 evolves into the state S2, for detection of the single-click event. The reset signal Res is set to the low state so as to enable counting, and switching of the event signal Ev into the low state is waited for.

If switching occurs when the count signal Cnt is greater than the limit time value $T_{s1}$, the finite-state machine 12 evolves into the state S3, in which the reset signal Res is set to the high state so as to reset the counter stage 14, and then into the initial state S1, awaiting a new recognition of a possible click event.

Instead, switching to the low state of the event signal Ev when the count signal Cnt is lower than or equal to the limit time value $T_{s1}$ is indicative of detection of the single-click event, and the finite-state machine 12 evolves into the state S4, in which the first interrupt signal INT1x, INT1y, INT1z corresponding to the single-click event switches to the high value "1", and the reset signal Res is set to the high state.

From the state S4 the finite-state machine 12 passes to the state S5, in which it waits for the latency time interval to elapse, without monitoring the event signal Ev (the reset signal Res is low to enable counting). Consequently, it remains in the state S5 as long as the count signal Cnt remains lower than or equal to the latency time value $T_{s2}$, and, when the count signal Cnt exceeds this value, there is the transition to the next state S6 in which the count signal Cnt is again reset to zero.

The finite-state machine 12 then evolves into the state S7 for detection, within the pre-set time window, of a second click event. In detail, the reset signal Res is brought back into the low state, and the finite-state machine 12 remains in the state S7 as long as the event signal Ev remains low and the count signal Cnt does not exceed the window time value $T_{s3}$.

If, at the end of the window interval, the event signal Ev has remained low, the finite-state machine 12 evolves into the state S8, in which counting is reset, and then into the initial state S1.

If, instead, the event signal Ev switches to the high state within the aforesaid window interval (with the count signal Cnt smaller than or equal to the window time value $T_{s3}$), the finite-state machine 12 passes to the state S9, in which counting is reset, and then to the state S10, for detection of the second click event (which occurs in a way altogether similar to the detection of the first click event).

In detail, in the state S10, counting is enabled, and the finite-state machine 12 remains waiting for switching of the event signal Ev into the low state.

If switching occurs when the count signal Cnt is greater than the limit time value $T_{s1}$, the finite-state machine 12 evolves into the state S11, in which the reset signal Res is set to the high state so as to reset the counter stage 14, and then to the initial state S1, for a new event detection.

Instead, switching to the low state of the event signal Ev when the count signal Cnt is lower than or equal to the limit time value $T_{s1}$ is indicative of recognition of the double-click event, and the finite-state machine 12 evolves into the state S12, where the second interrupt signal corresponding to the double-click event INT2x, INT2y, INT2z is set to "1", and the reset signal Res is set to the high state.

From what has been described and illustrated, the advantages that the sensor device according to one or more embodiments of the invention affords are clear.

A single monolithic integrated device, in fact, incorporates all the operations related to detection of events, even particular or multiple ones. The dedicated integrated circuit 6 implements for this purpose within the sensor device 2 processing not only of the instantaneous value of the detection signals, but also of their change over time (i.e., temporal evolution) within given time intervals. In this way, it is possible to detect, directly within the sensor device 2, events repeated in time or characterized by a particular temporal evolution of the associated detection signals. The dedicated integrated circuit 6 generates interrupt signals INT for the microprocessor circuit 3 of the corresponding electronic apparatus 1, which is thus freed from burdensome operations of numeric processing of the detection signals. The event detection is thus faster and more reliable.

Thanks to its particular configuration, the integrated detection circuit also involves a limited use of resources and a low area occupation for its implementation. In particular, only one counter stage 14 is used for monitoring the various time windows, for detection of events of various types (for example, single-click or double-click events). It is also advantageous the possibility of varying the counter clock frequency to adapt to the characteristics of the windows for monitoring of the detection signal (for example, as regards a corresponding range or step of variation).

The described circuit has a high configurability, given that it is sufficient to modify from outside the threshold values, the time values for the count, or the modalities of state transition of the finite-state machine 12 to adapt detection to different types of events.

Finally, it is clear that modifications and variations can be made to what has been described and illustrated herein, without thereby departing from the scope of the present invention, as defined in the annexed claims.

Figure 7:
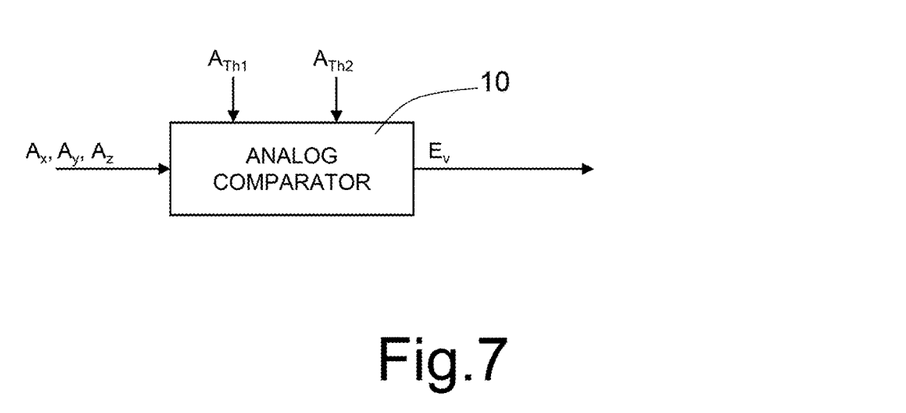
FIG. 7 shows a block diagram of a variant of an analysis stage of the integrated circuit of FIG. 3 according to one embodiment.

For example, the analysis stage 10 can be modified as illustrated in FIG. 7, by introducing for the analog comparator a second acceleration threshold $A_{Th2}$ in addition to the first acceleration threshold $A_{Th1}$. In particular, both thresholds can be positive and have different values so as to define a detection with hysteresis of the value of the detection signals (in a per se known manner that is not described in detail herein). The presence of a region of hysteresis enables filtering of possible bouncing and noise existing on the detection signals. Alternatively, the first and second acceleration threshold $A_{Th1}$, $A_{Th2}$ can have the same value and opposite sign so as to detect both positive and negative accelerations. The sign of the detected acceleration could be exploited for recognizing the direction of the acceleration acting on the sensor device 2, and to determine a particular action exerted by the user on the electronic apparatus 1 (in the case of click events, it would be possible, for example, to detect in a different way click events coming from different areas of the apparatus, for example, from a "right" half or "left" half with respect to a corresponding median axis). Acceleration thresholds could also be varied dynamically to take into account the d.c. component of acceleration, by a feedback mechanism. In addition, different acceleration thresholds could be used for the various axes of detection x, y, z.

Figure 8:
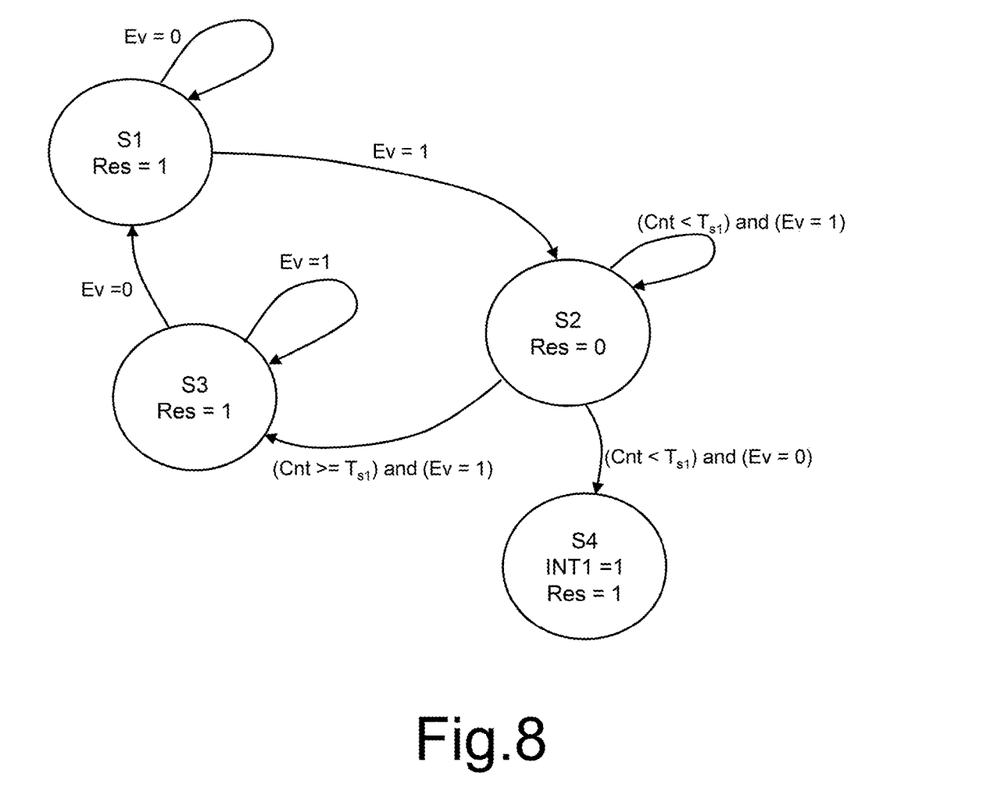
FIG. 8 shows a variant for part of the state transition diagram of FIG. 6 according to one embodiment.

Furthermore, the way in which state transition if the finite-state machine 12 occurs could be modified, as illustrated in FIG. 8 regarding single-event detection. In particular, according to this variant, the finite-state machine 12 remains in the state S2 as long as the event signal Ev is high and the count signal Cnt is smaller than the time limit $T_{s1}$. If the count signal Cnt becomes greater than or equal to the time limit $T_{s1}$ and the event signal is still high, the finite-state machine 12 evolves into the state S3, in which the reset signal Res is set to the high state. It then remains in the state S3 as long as the event signal Ev remains at the high value, and then passes into the initial state S1 upon switching of the event signal Ev to the low value. Instead, switching to the low state of the event signal Ev in the state S2 (when the count signal Cnt is smaller than the limit time value $T_{s1}$) is indicative of detection of the single-click event, and the finite-state machine 12 evolves into the state S4, in which the first interrupt signal INT1x, INT1y, INT1z for the single-click event switches to the high value "1". Basically, in the variant described (which can be applied of course also to detection of a second click event in the state S10 of FIG. 6), the transition of the finite-state machine 12 from the state S2 is determined also by the value assumed by the count signal Cnt and by the counting threshold being reached, and not only by the value of the event signal Ev.

Furthermore, the comparator of the analysis stage 10 can be analog or else digital, according to whether the detection signals coming from the sensing structure 5 have previously been converted into digital form or not. In addition, it is evident that the analysis stage 10 can be made in a different way, and in particular have any configuration that will enable recognition of a potential event (for example, as described in U.S. Patent Application Publication No. 2006/0214913 filed in the name of the present applicant).

The described circuit can be associated to different types of sensors (for example, gyroscopes or inclinometers, pressure sensors, or force sensors), even ones not built using MEMS techniques. More in general, it can be implemented in all the applications that require generation of interrupt signals upon recognition of events, using a low occupation of resources for numeric processing and a low occupation of physical area.

It is moreover evident that the circuit described, with modification of the state transition in the finite-state machine 12, could be configured so as to detect an even greater number of repeated events (for example, a hypothetical triple-click event).

Finally, the electronic apparatus 1 of one embodiment need not be provided with a microprocessor. In this case, the interrupt signal INT generated continuously by the sensor device 2 could, for example, control directly a switch designed to enable/disable a given function within the apparatus, or else control turning-on of a warning light, or issuing of an acoustic signal.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, Abstract, and the claims, but should be construed to include all possible embodiments along with the full scope of equivalents to which such claims are entitled. Accordingly, the claims are not limited by the disclosure.

What is claimed is:

1. A system, comprising:
   a package;
   a chip positioned in the package;
   a micro-electromechanical sensor formed in the chip; and
   an integrated circuit formed in the chip, the integrated circuit being configured to receive a detection signal from the sensor, detect a first event based on a change in the detection signal over a period of time, and generate a first interrupt signal in response to detecting the first event, wherein the integrated circuit is configured to set an event signal to a first value in response to detecting the first event, set the event signal to a second value in response to detecting an end of the first event, and generate the first interrupt signal in response to detecting that the event signal has changed from the first value to the second value within a time period defined by a time signal.

2. The system of claim 1, further comprising a microprocessor coupled to the package, the microprocessor being configured to receive the first interrupt signal from the integrated circuit.

3. The system of claim 1 wherein the integrated circuit is configured to detect a second event based on values of the detection signal within a first time window and a second time window subsequent to said first time window and on a relationship between said values, and generate a second interrupt signal in response to detecting the second event.

4. The system of claim 1 wherein the integrated circuit includes:
   a finite state machine configured to generate a current state signal and generate the first interrupt signal based on the event signal and the time signal; and
   a timing stage configured to generate the time signal in response to a clock signal and the current state signal.

5. The system of claim 4 wherein the finite state machine is configured to generate the current state signal based on the event signal and a previous time signal.

6. The system of claim 4 wherein the finite state machine is configured to operate at a frequency higher than a frequency of the clock signal.

7. The system of claim 1 wherein the integrated circuit includes:
   an analysis stage configured to set the event signal to the first value in response to an instantaneous value of said first detection signal;
   a timing stage configured to generate the time signal, which is indicative of a time window in which said first detection signal assumes said instantaneous value; and
   a finite state machine that is configured to generate the first interrupt signal in response to said event signal and said time signal.

8. A method, comprising:
   forming a micro-electromechanical sensor in a chip; and
   forming an integrated circuit in the chip, the integrated circuit being configured to receive a detection signal from the sensor, detect an event based on a change in the detection signal over a period of time, and generate an interrupt signal in response to detecting the first event, wherein forming the integrated circuit includes configuring the integrated circuit to set an event signal to a first value in response to detecting the event, set the event signal to a second value in response to detecting an end of the first event, and generate the interrupt signal in response to detecting that the event signal has changed from the first value to the second value within a time period defined by a time signal.

9. The method of claim 8, further comprising coupling the chip to a microprocessor, the microprocessor being configured to receive the interrupt signal.

10. The method of claim 9, further comprising positioning the chip on a printed circuit board and positioning the microprocessor on the printed circuit board.

11. The method of claim 8, wherein forming the integrated circuit includes:

forming a finite state machine configured to generate a current state signal and generate the interrupt signal based on the event signal and the time signal; and forming a timing stage configured to generate the time signal in response to a clock signal and the current state signal.

12. A device, comprising:

a micro-electromechanical sensor; and an integrated circuit configured to receive a detection signal from the sensor, detect a first event based on a change in the detection signal over a period of time, and to generate a first interrupt signal in response to detecting the first event, wherein the integrated circuit is configured to set an event signal to a first value in response to detecting the first event, set the event signal to a second value in response to detecting an end of the first event, and generate the first interrupt signal in response to detecting that the event signal has changed from the first value to the second value within a time period defined by a time signal.

13. The device of claim 12, wherein the integrated circuit is configured to detect a second event based on values of the detection signal within a first time window and a second time window subsequent to said first time window and on a relation between said values, and generate a second interrupt signal in response to detecting the second event.

14. The device of claim 12, wherein the integrated circuit includes:

a finite state machine configured to generate a current state signal and generate the first interrupt signal based on the event signal and the time signal; and a timing stage configured to generate the time signal in response to a clock signal and the current state signal.

15. The device of claim 14, wherein the finite state machine is configured to generate the current state signal based on the event signal and a previous time signal.

16. The device of claim 14, wherein the finite state machine is configured to operate at a frequency higher than a frequency of the clock signal.

17. The device of claim 12, wherein the integrated circuit includes:

an analysis stage configured to set the event signal to the first value in response to an instantaneous value of said first detection signal;

a timing stage configured to generate the time signal indicative of a time window in which said first detection signal assumes said instantaneous value; and a finite state machine that is configured to generate the first interrupt signal in response to said event signal and said time signal.

* * * * *